United States Patent
Sakamoto et al.

[15] 3,688,095
[45] Aug. 29, 1972

[54] STEAM TURBINE CONTROL DEVICES

[72] Inventors: Tetsuzo Sakamoto, Yokohama-shi; Akiomi Torii, Kamakura-shi; Mituhisa Yokota, Yokohama-shi; Seiko Sato, Toky-to, all of Japan

[73] Assignee: Tokyo Shibaura Denki Kabushiki Kaisha (a.K.a. Tokyo Shibaura Electric Co., Ltd.), Kawasaki-shi, Japan

[22] Filed: Jan. 26, 1970

[21] Appl. No.: 5,770

[30] Foreign Application Priority Data
Feb. 27, 1969 Japan..................44/5305

[52] U.S. Cl..................235/151.1, 60/105
[51] Int. Cl.............................F01d 17/00
[58] Field of Search..........235/151, 151.34; 415/17; 60/105; 317/5; 290/40

[56] References Cited

UNITED STATES PATENTS

| | | |
|---|---|---|
| 3,097,488 | 7/1963 | Eggenberger et al....60/105 X |
| 3,097,489 | 7/1963 | Eggenberger et al....60/105 X |
| 3,274,443 | 9/1966 | Eggenberger et al.........317/5 |
| 3,340,883 | 9/1967 | Peternel...................415/17 X |
| 3,446,224 | 5/1969 | Zwicky Jr....................415/17 |

*Primary Examiner*—Eugene G. Botz
*Attorney*—Robert E. Burns and Emmanuel J. Lobato

[57] ABSTRACT

In a steam turbine control device wherein a steam control valve is controlled by a main control system responsive to an opening command signal from a speed control or a load control of the turbine, there are provided a throttle governing feedback circuit and a nozzle governing circuit which are connected in parallel and respond to the opening of the regulator valve to correct the opening thereof and a control circuit operative to gradually vary the difference signal between the feedback signals of the throttle governing and nozzle governing feedback circuits and to feed back the gradually varying difference signal to the main control system to switch the control of the steam regulator valve from the throttle governing operation to the nozzle governing operation without causing rapid increase of the steam flowrate. The control device is also provided with means to detect the rate of change in the steam pressure on the downstream side of the regulator valve.

6 Claims, 3 Drawing Figures

THROTTLE GOVERNING OPERATION

NOZZLE GOVERNING OPERATION

STEAM TURBINE CONTROL DEVICES

BACKGROUND OF THE INVENTION

This invention relates to a steam turbine control device for steam turbines controlled by electro-hydraulic control wherein the controlling characteristics of switching the degree of opening of the control valve is improved.

Generally, the control of the speed and output of a steam turbine is effected by controlling the quantity of steam supplied to the turbine from a steam generator. Previously such control was effected by providing a stop or cut-off valve and a control or regulator valve which are connected in series between the steam generator and the turbine. To start the turbine, the stop valve is gradually opened while the regulator valve is maintained in its fully opened state. When the turbine speed or load reaches a predetermined low load, the control is switched from the stop valve to the regulator valve. More particularly, the stop valve is fully opened, and the opening of the regulator valve is gradually increased from an opening corresponding to said predetermined load.

Recently, with the increase of the turbine capacity and the development of electric control systems, it is common practice to control the flow quantity of the steam by varying the opening of the regulator valve while the stop valve is maintained in its fully opened state throughout the operation of the turbine, that is from start to normal operation through the period of acceleration. In such a control system the control or regulator valve is not a simple valve but comprises a number of (for example four) individual unit valves which are connected in parallel flow relationship. During starting, openings of all unit valves are simultaneously increased from their fully closed states (herein this mode of control is referred to as the "throttle governing operation"). Under these conditions, all unit valves are opened equally to pass equal quantity of steam. When the speed or load reaches a predetermined low value, say, for example, 20 percent of the rated value, one or two unit valves are selected and their openings are gradually increased toward full opening. When these selected unit valves are fully opened another unit valve or valves are selected and their openings are similarly gradually increased toward full opening. In this manner the turbine is brought up to its full load (hereinafter this scheme of control is termed the "nozzle governing operation"). For this purpose, in order to maintain the desired operating characteristics of the turbine, the steam control valve is provided with a main control system responsive to the input from a speed control responsive to the turbine speed or a load control responsive to the turbine or generator load to adjust the opening of the control valve and a feedback system which functions to correct the opening of the control valve to the desired setting. With this turbine control device, when an electrical command signal for varying the degree of opening of the control valve is received from the speed control or load control, the input command signal is compared with a signal representing the actual degree of opening of the control valve and the difference signal is utilized to actuate a hydraulic pressure cylinder via a servovalve to adjust the opening of the control valve to the setting commanded by the main control. Concurrently therewith, the feedback system operates to provide a correction control to the control valve so as to vary linearly the flow quantity of the steam. This operation is continued until the difference signal is reduced to zero by a closed loop formed by the main control system and the feedback system. On the other hand, in the control system for switching the steam control valve utilizing the throttle governing operation and the nozzle governing operation for operating the turbine, since the same feedback signal results in different control valve opening characteristics for the throttle governing and nozzle governing operations as will be described hereinafter with references to FIGS. 2 and 3, when the valve control is switched from throttle governing operation to nozzle governing operation, the control valve is rapidly opened to rapidly increase the quantity of high temperature and high pressure steam admitted to the turbine, thus causing severe heat shock and damage to the nozzle box and turbine casing.

SUMMARY OF THE INVENTION

It is therefore an object of this invention to provide a novel turbine control device which can prevent rapid change in the degree of opening of the steam control or regulator valve at the time of switching of the turbine control from throttle governing operation to nozzle governing operation and which can prevent high temperature high pressure steam from applying heat shock to various component parts of the turbine.

According to this invention there is provided a steam turbine control device comprising a main control system responsive to an opening command signal from a speed control or a load control of the turbine to control a steam regulator valve, a throttle governing feedback circuit and a nozzle governing feedback circuit connected in parallel and responsive to the opening of the steam regulator valve to correct the opening thereof, and a control circuit operative to gradually vary the difference signals between the feedback signal of the throttle governing feedback circuit and the nozzle governing feedback circuit, respectively, and to feed back the gradually varying difference signal to the main control system to switch the control of the steam regulator valve from throttle governing operation to nozzle governing operation without causing rapid increase of the flow quantity of the steam flowing into the steam turbine.

In accordance with another aspect of this invention, the above described turbine control device is further provided with means to detect the rate of change in the steam pressure on the downstream side of the regulator valve to gradually vary the opening of the regulator valve during said switching.

BRIEF DESCRIPTION OF THE DRAWING

The invention can be more fully understood from the following description when taken in conjunction with the accompanying drawing in which.

DESCRIPTION OF THE PREFERRED EMBODIMENT

Figure 1:
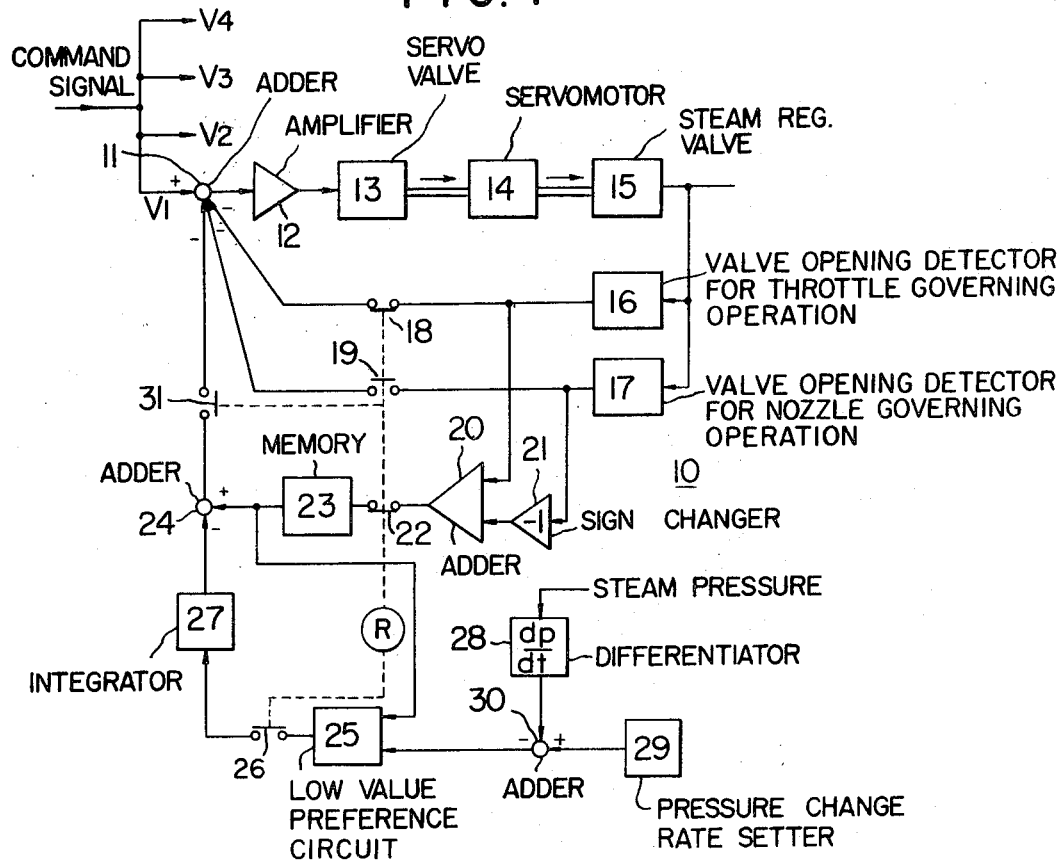
FIG. 1 is a block diagram of a turbine control device embodying the present invention.

FIG. 1 shows one example of the electrical portion of a control device of this invention as applied to the control of a steam turbine employing four parallel control or regulator valves only one of which is shown. As described hereinafter, a command signal is divided into four component signals V1 to V4 which are each applied to a control device 10 associated with respective ones of the control or regulator valves. Although the control system for operating the control valves and for switching the same is shown in detail only in connection with one regulator or control valve 15 which receives the command signal V1, it is to be understood that the other control or regulator valves are also provided with identical control systems. At one terminal of a main control system, not shown, these control systems are connected in parallel for controlling the opening and switching of respective ones of the control valves. The control device 10 for the first regulator or control valve 15 comprises an adder 11, an amplifier 12, and a servovalve 13 all connected in series and a servomotor 14 hydraulically controlled by the servovalve 13. The servomotor 14 is mechanically connected to the steam regulator valve 15 to regulate its opening. Connected in parallel to steam regulator valve 15 are a detector 16 for detecting the degree of opening of the regulator valve 15 for the throttle governing operation and a detector 17 for detecting the degree of opening of the regulator valve for the nozzle governing operation, said detectors comprising a feedback system for the control device. Detectors 16 and 17 are connected to adder 11 via contacts 18 and 19, respectively, which are arranged in a manner such that they are not closed simultaneously, but either one of them is closed at any one time. Further, the output from the detector 16 is applied to an adder 20, and the output from the detector 17 is applied to the same adder via a sign changer or a polarity reverser 21. The output from adder 20 is supplied to a memory device 23 which memorizes the difference in the values of feedback signals at the time of both modes of speed governing through contact 22 which is closed prior to the opening of contact 18 and closure of contact 19 when the control of the valve is switched from throttle governing operation to nozzle governing operation by a relay R responsive to a predetermined load of the generator driven by the turbine. The output from the memory is supplied directly to an adder 24 and the output from the memory is supplied indirectly to adder 24 via a low value preference circuit 25, a contact 26 interconnected with contact 22 and operated by the relay R, and an integrator 27. Another input to the low value preference circuit 25 is supplied from an adder 30 which is connected to a differentiator 28 responsive to the steam pressure on the downstream side of the control valve and a pressure change rate setter 29. Adder 24 is connected to adder 11 through a contact 31 which is closed concurrently with the switching of contacts 18 and 19 as shown by dotted lines.

Figure 2:
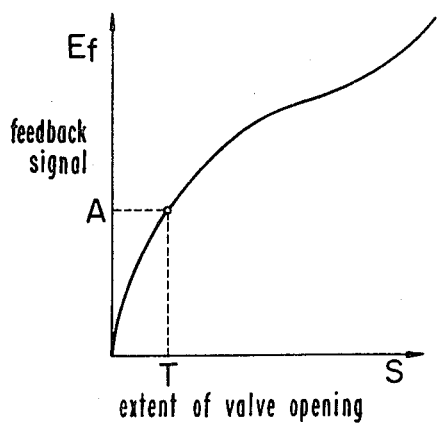
FIG. 2 shows a feedback signal characteristic curve at the time of throttle governing operation.

Since the four control valves respectively receiving the command signals V1 through V4 operate identically, the operation of the first steam regulator valve 15 alone is described hereunder. A command signal V1 for controlling the desired the degree of opening of the valve is transmitted from a main control system, not shown, and passes through adder 11 and is amplified by amplifier 12 to actuate servovalve 13, which accordingly opens the first steam regulator valve 15 through servomotor 14. Then a signal representing the degree of opening of the first regulator valve 15 is transmitted to the detector 16 for the throttle governing operation and to the detector 17 for the nozzle governing operation. In steam turbines, it is usual to control the turbine speed by throttle governing operation during running from start to a predetermined low load, for example, 20% of the rated load. At this time, contact 18 is closed while contact 19 is opened by means of a suitable generator load-responsive device such as the relay R. As a result, a signal produced by valve opening detector 16 and functioning to adjust the opening of the regulator valve to the desired opening is transmitted to adder 11 and is compared with or added to the command signal V1 thus forming a feedback circuit for the throttle governing operation to provide an appropriate opening of the throttle valve. When the turbine reaches a predetermined low load under throttle governing operation, it is necessary to switch the turbine control to nozzle governing operation. To accomplish this, contact 18 is opened and contact 19 is closed. The phenomena occurring at this transition are shown by the characteristic curves shown in FIGS. 2 and 3 wherein the ordinate represents the feedback signal and the abscissa the stroke or opening of the valve. As shown in FIG. 2, during the throttle governing operation, the opening of the steam regulator valve corresponding to a feedback signal A is shown by reference character T, while the opening of the steam regulator valve corresponding to the same signal for the nozzle governing operation is represented by N which is larger than T. As a result, at the time of switching, the opening of the regulator valve is rapidly changed from T to N whereby the high temperature, high pressure steam admitted to the turbine is also rapidly increased thus causing a severe heat shock to the internal structure of the turbine.

Figure 3:
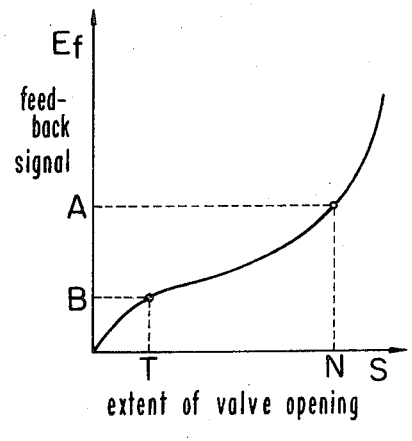
FIG. 3 shows a feedback signal characteristic curve at the time of nozzle governing operation.

This invention contemplates the provision of a novel control apparatus that can eliminate this problem. During the throttle governing operation, the output signals from detectors 16 and 17 for detecting valve openings of the throttle governing and the nozzle governing operations, respectively, are shown by A and B, respectively, as shown in FIGS. 2 and 3. It is to be remembered that signal A is coupled directly to adder 20, whereas signal B is coupled to the same adder through sign changer 21. Adder 20 functions to add these two signals and the resultant signal (A–B) is applied to the memory device 23 and stored therein through contact 22, which has been closed prior to the switching. Concurrently with the switching of contacts 18 and 19, contacts 31 and 26 are closed whereas contact 22 is opened to apply to adder 11 output signal B from the valve opening detector 17 and output signal (A–B) from memory 23 through adder 24 and contact 31. Prior to this time, the integrator 27 has not been operating and therefore its output is zero so that signals B and (A–B) are added by adder 11 to provide a feedback signal A. Thus even at the time of switching, the signal A is present in the feedback circuit, and since the magnitude of the feedback signal is maintained constant, it is possible to avoid the undesirable heat shock mentioned above. Further, as contact 26 is also closed at the time of switching, signal (A-B) supplied to a low value preference circuit or low value gate 25 from memory device 23 is transmitted to adder 24 via contact 26 and integrater 27, which functions to reverse the polarity of signal (A-B). Thus, adder 24 adds signal (A-B) from the memory device 23 and the output from integrator 27, or a signal of the opposite sign and of a magnitude corresponding to the time integral of (A-B) to produce an output which gradually decreases its magnitude from (A-B) to zero. As the output signal from adder 24 decrease as above described, the deviation signal from adder 11 increases correspondingly to operate steam regulator valve 15 through servovalve 13 and servomotor 14 to vary the feedback signal supplied to valve opening detector 17 by an amount corresponding to the change in the input signal supplied from adder 24 to adder 11. Thus, an equilibrium is reached at a new point to correct the opening of the steam regulator valve. As above described, as the output signal from adder 24 is gradually decreased to zero from (A-B), B), the opening of the steam regulator valve is increased to N as shown in FIG. 3, at which time the feedback signal becomes A to reestablish the equilibrium.

In the above description, signals A and B were assumed constant, actually feedback signals Ef vary with time as shown in FIGS. 2 and 3. The purpose of the memory device is to store the value of (A-B) at the time of switching (which are the values depicted in FIGS. 2 and 3) and to apply the value (A-B) to the adder 24 as well as the time integral of the value (A-B) thereby gradually decreasing the value of the feedback signal from A at N to B at T.

In order to limit the variation in the steam quantity caused by the change in the opening of the steam regulator valve which occurs when the control is switched from the throttle governing operation to the nozzle governing operation, the low value preference circuit 25 operates as follows. Thus, adder 30 operates to compare a reference signal from setter 29 which sets the desired rate of change of the steam pressure with a signal obtained by differentiating the value of the steam pressure on the downstream side of the regulator valve by means of differentiator 28. As the actual rate of change of the steam pressure increases, the output from the adder 30 decreases. Low value preference circuit 25 transmits this decreased output from adder 30 to integrator 27 in preference to the signal from memory 23. In this manner the switching operation is controlled by the speed change determined by steam pressure change rate setter 29.

As above described this invention provides a novel steam turbine control apparatus according to which, at the time of switching the control of the opening of a steam regulator valve from throttle governing operation to nozzle governing operation in an operating range from start to a predetermined low load operation, the feedback signal is maintained in a closed loop to continue control, while at the same time the feedback signal is controlled so as to prevent rapid change in the quantity of steam supplied to the turbine when the opening of the regulator valve is varied. Furthermore, during switching, the opening of the steam regulator valve is gradually varied in accordance with the rate of change of the flow quantity of the steam, thus eliminating the risk of heat shock of the steam turbine.

We claim:
1. A steam turbine control device comprising a main control system responsive to an opening command signal to control a steam regulator valve, a throttle governing feedback circuit and a nozzle governing feedback circuit, means connecting said feedback circuits in parallel to said main control system to respond to the opening of said steam regulator valve to correct the opening thereof, switching means responsive to a predetermined load of the turbine for switching the connection of said feedback circuits to said main control system, and a control circuit operative to develop and gradually vary a difference signal between the feedback signals of said throttle governing feedback circuit and said nozzle governing feedback circuit, respectively, and controlled by said switching means to feed back said gradually varying difference signal to said main control system to switch the control of said steam regulator valve from a throttle governing mode of operation to a nozzle governing mode of operation without causing rapid increase of the flow quantity of the steam flowing into said steam turbine.

2. The steam turbine control system according to claim 1 which further comprises means to gradually vary the opening of said steam regulator valve in accordance with the rate of change of the steam pressure on the downstream side of said regulator valve.

3. The steam turbine control system according to claim 1 which further comprises, a memory to store said difference signal between said feedback signals of said throttle governing feedback circuit and said nozzle governing feedback circuit, means to gradually integrate the output from said memory, and means to add the output from said memory and the output from said integrating means to gradually increase the feedback signal to said main control system thus preventing rapid change in the opening of said regulator valve at the time of switching of said throttle governing feedback circuit and said nozzle govering feedback circuit.

4. The steam turbine control system according to claim 3 which further comprises a low value preference circuit which transmits a signal representing a rate of change in the steam pressure different from a predetermined rate of change to said integrating means in preference to the output from said memory.

5. A steam turbine control device for controlling a turbine comprising: a steam valve movable from a closed position to an open position for admitting steam to a turbine; actuating means responsive to a command signal for effecting opening of said steam valve to an open position in accordance with said command signal; first detecting means for detecting the degree of opening of said steam valve and providing a corresponding first output signal; second detecting means for detecting the degree of opening of said steam valve and providing a corresponding second output signal of a different magnitude than said first output signal; comparing means receptive of a reference signal indicative of the desired degree of opening of said steam valve and one of said first and second output signals for comparing same and developing a resulting error signal to said actuating means; control circuit means for individually and sequentially applying said first and second output signals to said comparing means; and difference circuit means for developing a gradually varying difference signal representative of the gradual variation between said first and second output signals developed during opening of said steam valve and applying same to said comparing means only whenever said second output signal is applied thereto to obtain an error signal which effects a gradual further opening of said steam valve.

6. A control device according to claim 5; wherein said difference circuit means includes means for modulating said difference signal in accordance with the rate of change of the steam pressure on the downstream side of said steam valve.

* * * * *